Aug. 27, 1968  R. T. HOLLOWAY  3,398,858

TINTING APPARATUS AND METHOD

Filed June 27, 1966  2 Sheets-Sheet 1

Inventor
Ralph T. Holloway
By
McCanna, Marsbach + Pillote
Attorneys

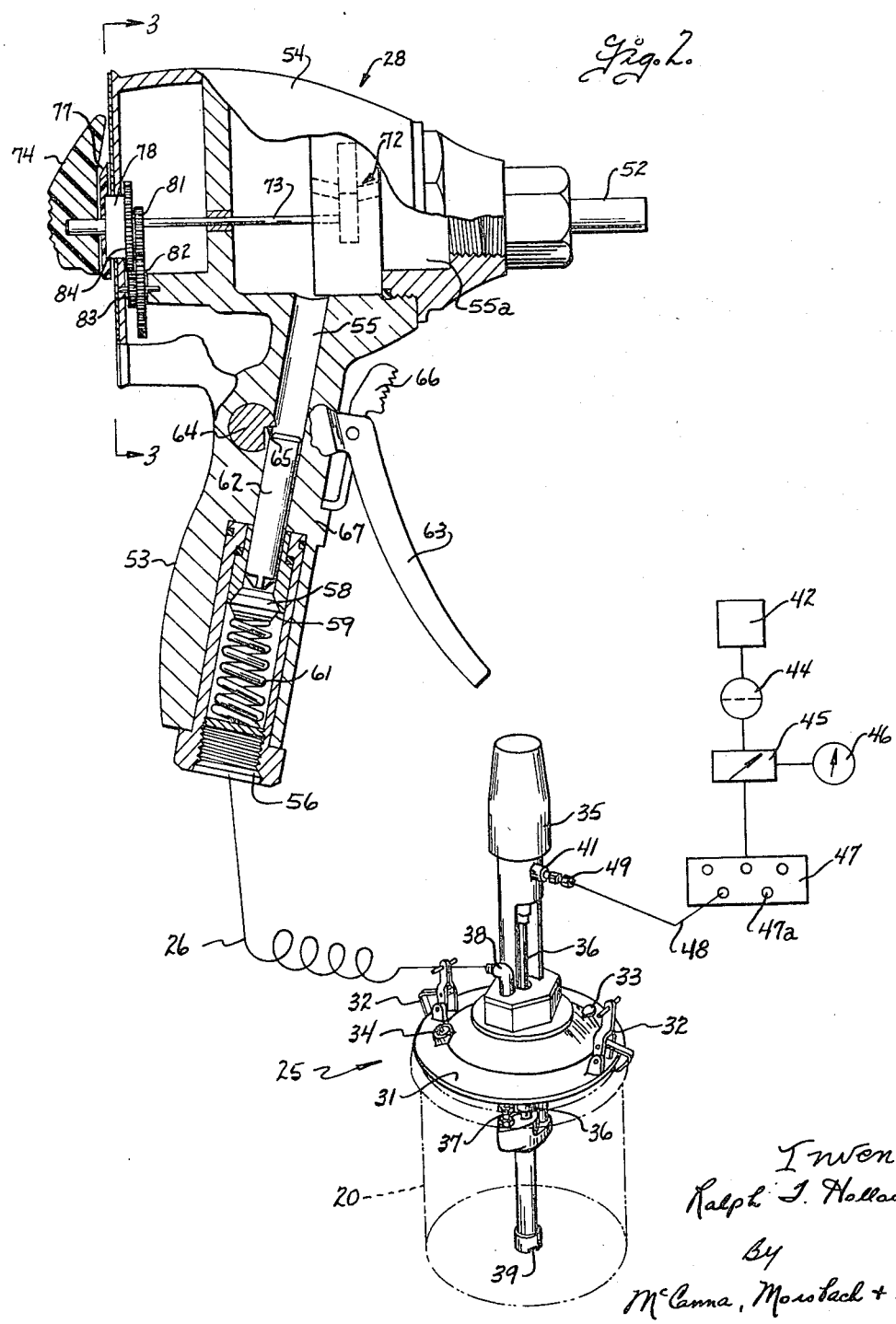

United States Patent Office

3,398,858
Patented Aug. 27, 1968

3,398,858
TINTING APPARATUS AND METHOD
Ralph T. Holloway, Rockford, Ill., assignor to The Valspar Corporation, Rockford, Ill., a corporation of Delaware
Filed June 27, 1966, Ser. No. 560,516
3 Claims. (Cl. 222—30)

ABSTRACT OF THE DISCLOSURE

A vehicle holding a plurality of colorant containers, each provided with an air-powered pump and a dispensing gun. The vehicle and supply are placed at a remote position from the tinting tank. The gun is positioned at the tank, and the colorant is pumped through its nozzle. The flow is metered, and the operator valves the flow to limit the quantity dispensed. The agitator is rotated to completely mix the ingredients.

---

The present invention relates generally to a tinting apparatus and method. More particularly, the present invention relates to a mobile tinting apparatus for dispensing colorant into stationary tinting tanks, and to a method of tinting wherein base and colorant ingredients are placed in a tinting tank having agitating means therein.

In the manufacture of paints, for example, it is usual to tint by the addition of one or more colorants to a base. The word "tint" or "tinting" are used herein to indicate adding a colorant to a base and it should be understood that this also includes shading by the addition of colorant. While formulas have been established for achieving particular colors, many variables require that the amount of colorant added to each batch be an empirical determination. The variables include slight differences in the quality or quantity of the various ingredients in the base, and the occasional necessity of adding an anti-skinning layer if the batch must sit overnight. Another variable is that presently there is no quick and convenient way of measuring the colorant added to the batch. These, and other problems, have made tinting a slow and tedious process and have caused the skilled tinter to be a very valuable employee. Accordingly, it is an object of the present invention to provide a tinting apparatus and method which is faster and more convenient than prior tinting operations.

In the past, colorant has been added by dipping a quantity from a colorant container. This creates the possibility of contamination by foreign particles or by skinning of the colorant in the open container. As a result, quantities of colorant are discarded and, since colorants can cost as much as twenty-five dollars a gallon, this is a considerable waste. Accordingly, it is an object of the present invention to provide a new and improved tinting apparatus and method for dispensing directly from the colorant container and which prevents contamination and effectuates savings in the use of colorant.

Another object is to provide a new and useful tinting apparatus and method for accurately measuring the colorant dispensed and for measuring at the tinting tank.

Still another object of the present invention is to provide a new and useful tinting apparatus for dispensing colorant and which is mobile and adapted for use with several tinting tanks.

Yet another object is to provide an improved tinting apparatus and method for dispensing colorant through a nozzle and for circulation of the colorant through the nozzle.

These, and other objects and advantages of the present invention will become apparent as the same becomes better understood from the following detailed description when taken in conjunction with the accompanying drawings wherein:

FIGURE 2 is a generally diagrammatic view of a portion of the apparatus of FIG. 1 and having some parts broken away for better illustration.

Reference is now made more particularly to the drawings which illustrate the best presently known mode of carrying out the invention and wherein similar reference characters indicate similar parts throughout the several views.

Figure 1:
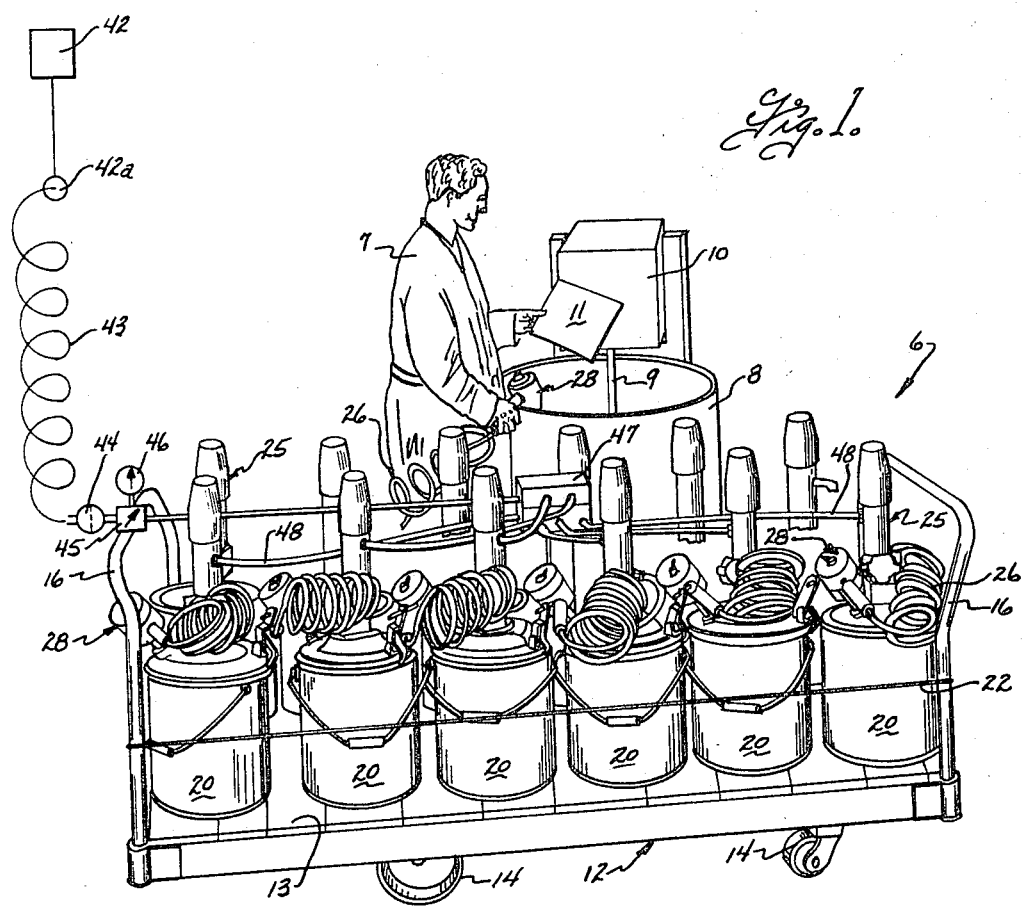
FIGURE 1 is a perspective view, in part diagrammatic, of a preferred embodiment of the invention and illustrates a manner of carrying out the process.

FIGURE 1 illustrates a mobile tinting apparatus, generally designated 6, being used by an operator or tinter 7 for dispensing colorant (not shown) into a tinting tank 8. As is conventional, the tinting tank is provided with an agitator (not shown) mounted on shaft 9 which is conveniently revolved by motor 10 to mix the base and colorant. The figure 11 designates a formula card to which the operator may easily refer while utilizing the invention.

The mobile tinting apparatus 6, in the embodiment illustrated, includes a vehicle 12 for carrying a plurality of colorant containers 20. Each container has a pumping unit 25 mounted thereon and arranged for pumping the colorant through a conduit or hose 26 to a valving and metering means 28. The vehicle, generally designated 12, is shown in the form of a hand truck having a bed 13 supported by a plurality of wheels 14 and conviently having handles 16 at either end of the bed. The wheels are advantageously coated to prevent sparking. The vehicle as thus far described is conventional and further description is deemed unnecessary. The colorant containers 20 are advantageously the original containers in which colorant is supplied and are herein illustrated as a typical five gallon size. The containers are conveniently surrounded by a line or chain 22 secured to handles 16.

The pumping unit, generally designated 25, advantageously has a cover 31 adapted to fit on the container 20 and be secured thereto by latches 32. The cover is provided with a covered fluid inspection port 33 and an opening 34 for receiving a nozzle 52 of the valving and metering means 28 for a purpose which will hereinafter become apparent. The pumping unit preferably includes a pneumatic pump 35 having a valve and piston therein which operate to reciprocate rod 36 and force the colorant through a supply outlet tube 37 to a fluid outlet 38 to which conduit 26 is connected. The supply outlet tube 37 is communicated with the container through a valved opening 39 disposed adjacent the bottom of the container. It should be understood that pumping unit 25 is illustrative of a pumping means for pumping the colorant from the container. It has been found, however, that a 1½ to 1 ratio pneumatic pump is particularly adapted for the present operation, and air is supplied thereto through inlet 41. A source of air, or other compressible fluid under pressure, is diagrammatically illustrated at 42. The source may conveniently be a supply of shop air, a bottled supply on the vehicle, or other convenient supply. If the former, the apparatus is provided with a self coiling inlet line 43 (FIG. 1) with a quick disconnect for connecting at any convenient outlet 42a. The inlet line conveniently leads to a filter 44, a pressure regulator 45 mounted on handle 16 and provided with a gauge 46, and to a manifold 47. The manifold is provided with a plurality of openings 47a to which are connected lines 48. Each line 48 has a valved coupling 49 (see FIG. 2) at the end thereof for connecting to inlet 41 on the pumping unit. In this manner, compressible fluid under pressure is supplied to pumping unit 25 for pumping colorant (not shown) from container 20 and through conduit 26 to outlet nozzle 52 advantageously located on the valving and metering means 28.

As indicated above, the valving and metering means 28 includes nozzle means 52 at the outlet of the conduit. It also includes valving means for controlling the flow of material dispensed, and metering means for measuring the material dispensed. While other arrangements are possible, the aforementioned means are conveniently in the form of a compact apparatus which may hereinafter sometimes be referred to as a gun. Whatever the form of the apparatus, it is preferred that the valving means and metering means be adjacent the outlet nozzle for control and observation by the operator at the tinting tank. The gun includes a handle portion 53 and a body portion 54. A passageway 55 extends from an inlet 56 in the handle portion to the outlet nozzle 52 on the body portion. The passageway conveniently provides an extension of conduit 26 which is attached at inlet 56. In the embodiment illustrated, the valving means includes a valve face 58 which is held against a seat 59 by a spring 61 to prevent flow through passageway 55. A stem 62, herein shown in the form of a hollow cylinder, is engaged with the opposite side of face 58 for moving it away from the seat when a lever 63 is depressed. Lever 63 is rigidly secured to pivot 64 which has a face 65 engaged with the end of stem 62 opposite the valve face. Pivot face 65 imparts motion to the stem when the lever 63 is depressed. A spring loaded latch 66 is arranged at one end of the lever and is engageable with a stop 67 for advantageously locking the valve in either an off or an on position. As shown in FIG. 2, the trigger 66 engages one side of stop 67 to lock the valve in the off position illustrated. Depressing the serrated end of the trigger 66 pivots the same and disengages the opposite end from the stop 67. Lever 63 may then be depressed to open the valve, as previously described. When lever 63 is depressed, trigger 66 can engage the other side of stop 67 to lock the valve in open or on position for a purpose hereafter described.

Figure 3:
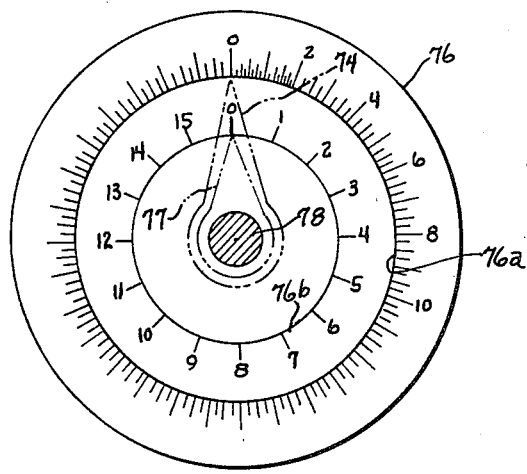
FIGURE 3 is a sectional view taken along line 3—3 of FIG. 2.

The metering means includes an apparatus disposed in an enlarged chamber 55a of passageway 55 for measuring the flow of material therethrough and is herein diagrammatically illustrated as a positive displacement gear-type meter 72. While it is preferable that the apparatus 72 be of the positive displacement type for accurately measuring the quantity of material at various flows, it should be understood that the apparatus is not limited to the gear-type. The apparatus 72 meters the flow of colorant and imparts motion to shaft 73 to which is attached a sweep pointer 74 disposed outside the body 54. A face 76 is attached to body 54 advantageously on the side opposite the nozzle 52 and has two rows of indicia as illustrated in FIG. 3. The outer row 76a conveniently indicates fluid ounces from zero to 32 and is preferably calibrated in ⅛ ounce increments, as shown between 0 and 2 ounces. The inner circle 76b of indicia indicates quarts of material dispensed and a second pointer 77 is arranged to move one such indicium upon a total revolution of pointer 74.

It is now deemed obvious that a tinter 7 may move the vehicle 12 adjacent a tinting tank 8, and connect the hose 43 to a convenient outlet 42a. In this manner he positions a supply of colorant spaced from the tinting tank and is ready to dispense the colorant. He then selects the colorant desired and moves the gun to the tinting tank. The colorant is then pumped by pneumatic pump 35 through conduit 26 to nozzle 52 at tinting tank 8. The operator valves the flow of colorant adjacent the nozzle by controlling the position of valve face 58 which is responsive to lever 63. In valving the flow, the operator or tinter simultaneously observes pointers 74 and 77 to control the amount of colorant dispensed through nozzle 52. Pointers 74 and 77 are responsive to apparatus 72 which meters the flow of colorant to measure the amount dispensed. The pointers and face 76 are on the side of body 54 opposite from nozzle 52 so that they may be easily observed while the nozzle is pointed away from the tinter.

After use, the valving and metering means 28 is stored in a particularly advantageous manner. For this purpose, opening 34 is provided on cover 31 and is shaped to receive nozzle 52 therethrough, thereby communicating the nozzle with the interior of the container 20. Conduit 26 is conveniently a self-coiling type so that, in storage, the apparatus is compact (FIG. 1). Storage of nozzle 52 in opening 34 serves to close off both the nozzle and the container when not in use. This also provides an advantageous manner for recirculating the colorant prior to use. Since the nozzle is communicated with the interior of the container, the operator can depress lever 63 and circulate the colorant by pumping the colorant through the nozzle and back into the supply. If desired, trigger 66 can be locked on stop 67 for prolonged recirculation. This provides a means for agitating the colorant and for providing freshly mixed colorant to the nozzle.

The invention in its broader aspects is not limited to the specific method and apparatus shown and described, but departures may be made therefrom within the scope of the accompanying claims without departing from the principles of the invention and without sacrificing its chief advantages.

What is claimed is:

1. A mobile paint tinting apparatus for dispensing colorant into tinting tanks during the manufacture of paint, the apparatus comprising: a vehicle movable between tinting tanks, said vehicle having a plurality of insulated wheels to prevent sparking, storage means on the vehicle for holding colorant and comprising a plurality of colorant containers each for holding a separate colorant, a cover for each container, a pneumatically operated pump supported on each cover and operative to pump colorant from its respective container, a source of compressible fluid under pressure, a manifold, a supply conduit extending from the manifold to the source of compressible fluid and having a pressure regulator associated therewith, a plurality of other conduits each extending from one pump to the manifold, a plurality of discharge conduits each associated with one of the pumps for receiving colorant therefrom and extendable from the pump to an end at the tinting tank, a gun on the one end of each discharge conduit, each gun having a handle portion connected to the discharge conduit and a body portion extending at an angle therefrom, a nozzle at one end of the body portion and facing laterally from the handle portion, a passageway in the gun communicating the discharge conduit with the nozzle, positive-displacement metering means in the passageway and adjacent the nozzle for measuring the amount of material dispensed therethrough, dial means on the handle portion at the end opposite said one end whereby the dial means is readily observable when colorant is dispensed through the nozzle, and indicator rotatably mounted adjacent the dial means, means operatively connecting the metering means with the indicator for moving the indicator correlative to the amount of colorant dispensed, valve means in the passageway for controlling the flow of the colorant, a lever adjacent the handle for selectively opening and closing the valve means, each closure having means for supporting its associated gun thereon in a storage position and for communicating the nozzle with the container, and means for locking the trigger with the valve in open position for recirculating of the colorant through the nozzle and into the container when in the storage position.

2. In a method of paint manufacture including tinting paint by adding a colorant ingredient to a base ingredient in a tinting tank having a rotatable agitator therein, the steps of:

positioning a manually manipulative gun at a supply of colorant;

pumping the colorant through a nozzle on the gun and back into the supply to circulate the colorant;

positioning the supply of colorant remote from the tinting tank;

positioning the gun at the tinting tank;

pumping the colorant to the nozzle and directing the flow into the tinting tank;

metering the flow of colorant at the gun to measure the volume of colorant dispensed and recording the same on a dial on the gun;

observing said dial and valving the flow of colorant at the gun to limit the amount of colorant dispensed in accordance with a preselected amount; and rotating the agitator and mixing the ingredients to tint the base.

3. In a method of paint manufacture including tinting paint by adding a colorant ingredient to a base ingredient in a tinting tank having a rotatable agitator therein, the steps of:

storing a supply of colorant in a container having an opening at the top thereof;

storing on the container a manually manipulative gun having a nozzle with the nozzle extending through the opening;

positioning the supply of colorant remote from the tinting tank;

positioning the gun at the tinting tank;

pumping the colorant to the nozzle and directing the flow into the tinting tank;

metering the flow of colorant at the gun to measure the volume of colorant dispensed and recording the same on a dial on the gun;

observing said dial and valving the flow of colorant at the gun to limit the amount of colorant dispensed in accordance with a preselected amount; and rotating the agitator and mixing the ingredients to tint the base.

References Cited

UNITED STATES PATENTS

| | | | |
|---|---|---|---|
| 1,912,748 | 6/1933 | Wilson | 222—66 X |
| 2,059,965 | 11/1936 | Joncha | 222—176 X |
| 2,123,656 | 7/1938 | Miller | 222—71 X |
| 2,192,862 | 3/1940 | Eagley | 222—176 X |
| 2,224,540 | 12/1940 | Fraser | 222—71 X |
| 2,236,095 | 3/1941 | Ginter | 222—176 X |
| 2,326,851 | 8/1943 | Gray | 222—71 X |
| 2,578,863 | 12/1951 | Trelease | 222—176 X |
| 2,788,402 | 4/1957 | Stiner et al. | 222—144.5 X |
| 2,777,610 | 1/1957 | Fox et al. | 222—135 X |
| 2,923,438 | 2/1960 | Logan et al. | 222—135 X |

ROBERT B. REEVES, *Primary Examiner.*

HADD S. LANE, *Assistant Examiner.*